US011144975B2

(12) United States Patent
Kaiser

(10) Patent No.: US 11,144,975 B2
(45) Date of Patent: *Oct. 12, 2021

(54) METHOD FOR DISPLAYING INTERACTIVE MAP OF USER SELECTABLE OBJECTS REPRESENTING SERVICE LOCATIONS, UPDATING SITE SPECIFIC WAITING LIST AND UPDATING AVERAGE HISTORICAL SERVICE TIME

(71) Applicant: Peter M. Kaiser, Edina, MN (US)

(72) Inventor: Peter M. Kaiser, Edina, MN (US)

( * ) Notice: Subject to any disclaimer, the term of this patent is extended or adjusted under 35 U.S.C. 154(b) by 279 days.

This patent is subject to a terminal disclaimer.

(21) Appl. No.: 15/682,710

(22) Filed: Aug. 22, 2017

(65) Prior Publication Data

US 2018/0130109 A1    May 10, 2018

Related U.S. Application Data

(63) Continuation of application No. 14/927,787, filed on Oct. 30, 2015, now Pat. No. 9,741,064, which is a
(Continued)

(51) Int. Cl.
*G06Q 10/06* (2012.01)
*G06Q 30/06* (2012.01)
*G06Q 10/02* (2012.01)

(52) U.S. Cl.
CPC ......... *G06Q 30/0613* (2013.01); *G06Q 10/02* (2013.01); *G06Q 10/063* (2013.01);
(Continued)

(58) Field of Classification Search
CPC ......... G06Q 30/0601; G06Q 10/06311; G06Q 10/063112; G06Q 10/063114
(Continued)

(56) References Cited

U.S. PATENT DOCUMENTS 6,023,681 A    2/2000  Whit
6,829,583 B1  12/2004  Knapp et al.
(Continued)

OTHER PUBLICATIONS

Click ahead seating Gives Patrons the Power to Add Their Names to Restaurant Wait Lists Online, New LRS Website Offers Restaurant Searches, Viewing of Wait Times and Call-Ahead Seating with the Click of a Mouse, Dallas—Jul. 2004, downloaded from www.archive.org on Oct. 9, 2013. (Year: 2004).*
(Continued)

*Primary Examiner* — Michelle T Kringen
*Assistant Examiner* — Annabelle J Lincoln
(74) *Attorney, Agent, or Firm* — Patterson Thuente Pedersen, P.A.

(57) ABSTRACT

An internet-based system and method allows customers to remotely check-in to a wait list for a no-appointment first listed-first served business. A location associated with a customer is received and an interactive map displays multiple icons with each icon corresponding to a location of the business. A dynamically updated estimated wait time for the wait list at each business location is displayed. A customer selection of a location at which to receive a service from the business is received by a selection of the icon representing the business and the customer is added to the wait list at the location.

9 Claims, 7 Drawing Sheets

Related U.S. Application Data continuation of application No. 13/327,994, filed on Dec. 16, 2011, now abandoned, which is a continuation of application No. 11/974,074, filed on Oct. 11, 2007, now Pat. No. 8,214,241.

(60) Provisional application No. 60/965,358, filed on Aug. 20, 2007.

(52) U.S. Cl.
CPC ... *G06Q 10/0631* (2013.01); *G06Q 10/06311* (2013.01); *G06Q 30/0603* (2013.01); *G06Q 30/0641* (2013.01)

(58) Field of Classification Search
USPC ...................................................... 705/26.41
See application file for complete search history.

(56) References Cited

U.S. PATENT DOCUMENTS

| | | | |
|---|---|---|---|
| 6,845,361 B1* | 1/2005 | Dowling | G06Q 10/02 705/13 |
| 6,895,381 B1 | 5/2005 | Selby | |
| 6,961,418 B1 | 11/2005 | Thygeson et al. | |
| 7,188,073 B1 | 3/2007 | Tam et al. | |
| 7,385,479 B1 | 6/2008 | Green et al. | |
| 7,430,411 B2 | 9/2008 | Sengupta et al. | |
| 7,522,992 B2 | 4/2009 | Obradovich et al. | |
| 7,756,745 B2 | 7/2010 | Leet et al. | |
| 7,768,395 B2 | 8/2010 | Gold | |
| 8,214,241 B2 | 7/2012 | Kaiser | |
| 8,589,819 B2 | 11/2013 | Allen | |
| 9,317,874 B2 | 4/2016 | Allen | |
| 9,741,064 B2 | 8/2017 | Kaiser | |
| 2002/0073012 A1 | 6/2002 | Lowell et al. | |
| 2002/0184069 A1* | 12/2002 | Kosiba | G06Q 10/04 705/7.38 |
| 2003/0165223 A1* | 9/2003 | Timmins | G06Q 10/02 379/207.02 |
| 2004/0039612 A1* | 2/2004 | Fitzgerald | G06Q 10/02 705/5 |
| 2004/0138929 A1 | 7/2004 | Awiszus et al. | |
| 2004/0224703 A1* | 11/2004 | Takaki | H04W 4/021 455/457 |
| 2005/0043996 A1 | 2/2005 | Silver | |
| 2005/0080675 A1 | 4/2005 | Lovegreen et al. | |
| 2005/0080676 A1 | 4/2005 | Lovegreen et al. | |
| 2005/0090951 A1 | 4/2005 | Good | |
| 2005/0138167 A1 | 6/2005 | Whitman, Jr. | |
| 2005/0200455 A1 | 9/2005 | Veni, III et al. | |
| 2005/0234637 A1* | 10/2005 | Obradovich | G01C 21/3461 701/425 |
| 2006/0229928 A1 | 10/2006 | Nix, Jr. | |
| 2006/0273920 A1 | 12/2006 | Doan et al. | |
| 2006/0277550 A1 | 12/2006 | Williams et al. | |
| 2007/0027806 A1 | 2/2007 | Sands et al. | |
| 2007/0225911 A1 | 9/2007 | Chanick | |
| 2007/0250355 A1 | 10/2007 | Leet et al. | |
| 2008/0040028 A1 | 2/2008 | Crump | |
| 2008/0103843 A1 | 5/2008 | Goeppert et al. | |
| 2008/0133283 A1 | 6/2008 | Backer et al. | |
| 2009/0055208 A1 | 2/2009 | Kaiser | |
| 2010/0302027 A1 | 12/2010 | Gold | |
| 2012/0109696 A1 | 5/2012 | Kaiser | |
| 2013/0275163 A1 | 10/2013 | Kaiser | |

OTHER PUBLICATIONS

A. S. Erdem and B. Gedikoglu, "A DSS for Shift Design and Workforce Allocation in a Call Center," 2006 Technology Management for the Global Future—PICMET 2006 Conference, 2006, pp. 1279-1289, doi: 10.1109/PICMET.2006.296696. (Year: 2006).*
EIC 3600 Search Report dated Aug. 31, 2016 (Originally Requested Jun. 12, 2017); 15 pages.
Office Action dated Jul. 31, 2018 for Canadian Application No. 2,638,938, 4 pages.
The Spa/Salon Manager, http://www.spasalon.com, undated but at least before Aug. 20, 2007.
Best for Cheap and Chic Chops, CUT, Time Out London, undated but at least before Aug. 20, 2007.
Salon Master, http://salonmaster.com, undated but at least before Aug. 20, 2007.
www.pager.net, Feb. 2, 2006, accessed via www.archive.org.
Application and File History for U.S. Appl. No. 11/974,074, filed Oct. 11, 2007. Inventor: Peter Kaiser.
Application and File History for U.S. Appl. No. 13/327,994, filed Dec. 16, 2011. Inventor: Peter Kaiser.
Application and File History for U.S. Appl. No. 13/892,807, filed May 13, 2013. Inventor: Peter Kaiser.
Application and File History for U.S. Appl. No. 14/927,787, filed Oct. 15, 2015. Inventor: Peter Kaiser.
MapInfo: MapInfo introduces easy way to add map searching features to web sites. M2 Presswire: N/A. Normans Media Ltd., Oct. 9, 1997, 12 pages.
Office Action dated Nov. 2, 2015 for Canadian Application No. 2,638,938, 4 pages.
Office Action dated Aug. 29, 2016 for Canadian Application No. 2,638,938, 5 pages.
Click ahead seating Gives Patrons the Power to Add Their Names to Restaurant Wait Lists Online, New LRS Website Offers Restaurant Searches, Viewing of Wait Times and Call-Ahead Seating with the Click of a Mouse, Dalllas—Jul. 2004, downloaded from www.archive.org on Oct. 9, 2013. (NPL in U.S. Appl. No. 13/327,994), 6 pages.
Office Action dated Jun. 14, 2019 for Canadian Application No. 2,638,938, 4 pages.
1389207 EIC 3600 Search Results (Year: 2019), 30 pages.
Notice of Allowance dated Feb. 19, 2021 for Canadian Application No. 2,638,938, 3 pages.
Office Action dated Feb. 19, 2021 for Canadian Application No. 2,638,938, 3 pages.
U.S. Appl. No. 13/892,807, Office Action dated Jun. 25, 2021, 35 pages.

* cited by examiner

FIG. 6

| Version 3.61 | | Point of Sale Screen Options | | | | Wed. Sept 13 - 10:10 AM |
|---|---|---|---|---|---|---|
| Product / Gift Cert. Sale | Quick Tender | Record a Walkout | Group Unrelated Customers | Complaint / Refund | Salon / Stylist Statistics | Employee Options |

Customer Wait List Options | Customer Service List Options

| Add Customer to Wait List | Remove Customer from Wait List | Change Family Member on Wait List | | Remove Customer from Service List | Move Customer Back to Wait List | Change Service Information |
|---|---|---|---|---|---|---|
| Joan Drager Regular Perm New Customer Est Wait (0) Act(1) | | | | | | |
| Nicole Fraam Haircut/Reg Style New Customer Est Wait (0) Act(1) | 228 | | | | 232 | |
| Don Graber Haircut New Customer Est Wait (0) Act(0) | | | | | | |
| Peter Kaiser # of Guests: 4 Web Check-in Est Wait (17) Act(16) | | | 224 | | | |
| | | | | | | |

Estimated Wait Time - 17 minutes

226

230

100
METHOD FOR DISPLAYING INTERACTIVE MAP OF USER SELECTABLE OBJECTS REPRESENTING SERVICE LOCATIONS, UPDATING SITE SPECIFIC WAITING LIST AND UPDATING AVERAGE HISTORICAL SERVICE TIME

RELATED APPLICATIONS

This application is a continuation of application Ser. No. 14/927,787 filed Oct. 30, 2015, which in turn is a continuation of application Ser. No. 13/327,994 filed Dec. 16, 2011, now abandoned, which in turn is a continuation of application Ser. No. 11/974,074 filed Oct. 11, 2007, now U.S. Pat. No. 8,214,241 issued Jul. 3, 2012, which claims the benefit of U.S. Provisional Application No. 60/965,358 filed Aug. 20, 2007, each of which is hereby fully incorporated herein by reference.

FIELD OF THE INVENTION

The present invention relates generally to a internet-based customer check-in system and method and more particularly to an internet-based customer check-in system and method that provides customers with more accurate estimated wait times for services at a plurality of locations shown on a map-based geographical display in real time.

BACKGROUND OF THE INVENTION

Many businesses, such as no-appointment hair salons, offer services to customers on a first-come, first-served basis and do not accept appointments. Because of this, customers typically do not know how long of a wait it will be to receive a desired service until arrival at the business location. If the wait is too long, the customer may decide to forego the service altogether. Although the customer can call ahead to learn an estimated wait time, many businesses do not allow a customer to have the customer's name put on the wait list until the customer enters the store. In addition, some businesses have numerous locations situated relatively near each other to which a customer has the option of going. However, a customer cannot practically determine which location will be able to provide the desired service the soonest, as this would entail visiting each location or making numerous phone calls to inquire about each location's wait time. In addition, the wait times customers receive are simply guesses by the employees typically based solely on the number of customers currently on the waiting list. Due to variations in the time it takes different employees to perform different services, such guesses are usually grossly inaccurate.

SUMMARY OF THE INVENTION

A internet-based customer check-in system and method allows customers to view estimated wait times at a plurality of service providing locations in order to select a location to visit based on the most convenient location and the best estimated wait time for the customer. A map based graphical display of service locations within the vicinity of the entered address and an estimated wait time to have the requested service performed at each location are presented to the customer. The customer can select a desired location to be placed on the location's no-appointment, first listed-first served waiting list by business of a location by selecting an icon on the map representing that location.

BRIEF DESCRIPTION OF THE FIGURES

The invention may be more completely understood in consideration of the following detailed description of various embodiments of the invention in connection with the accompanying drawings, in which:

FIG. 6 is a screenshot of a store interface of a web-based customer check-in system according to the present disclosure.

Figure 1:
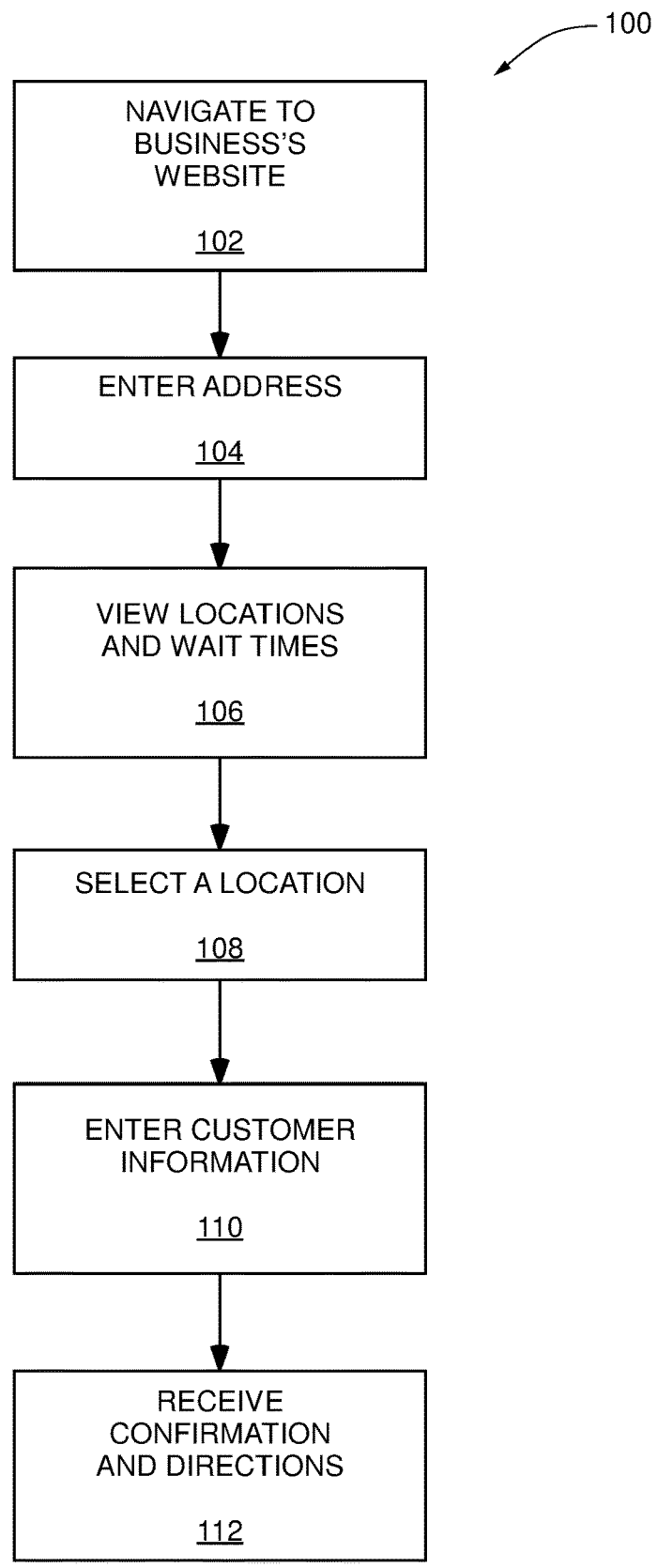
FIG. 1 is flowchart of steps taken by a customer to join a waiting list using a web-based customer check-in system according to the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Figure 2:
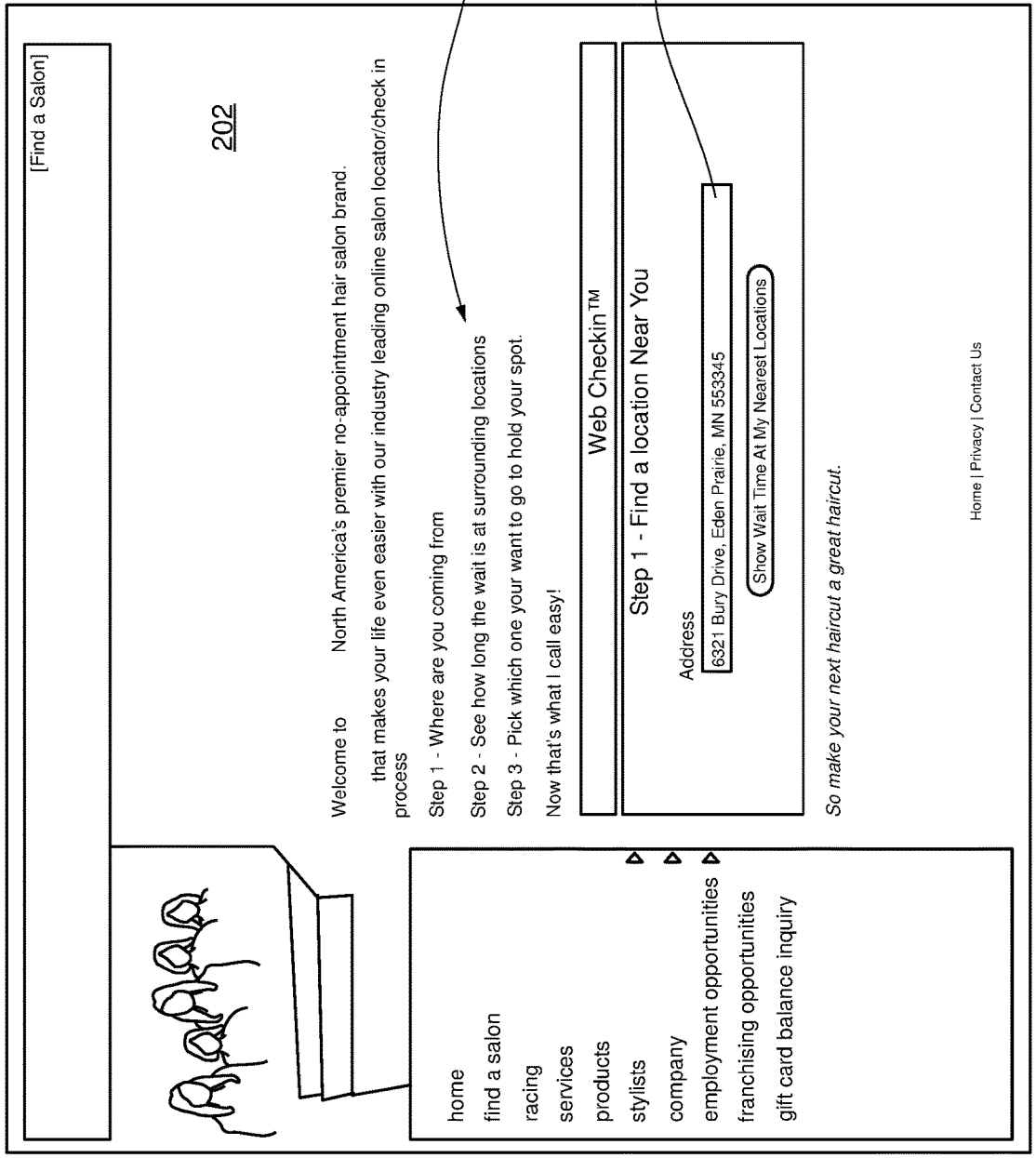
FIG. 2 is a screenshot of a welcome page of a web-based customer check-in system according to the present disclosure.

FIG. 1 depicts the steps 100 taken by a customer to use a web-based customer check-in system according to the present disclosure. Initially, the customer accesses the internet and navigates to a business's website to access its web-based customer check-in welcome page 202, depicted in FIG. 2, at step 102. The welcome page 202 can provide instructions 204 regarding the operation of the web-based customer check-in system for new customers. At step 104, the customer can enter an address into a text box 206 on the welcome page 202 so that the system can locate service locations of the business near the address. The address can be the customer's home, office, or any other reference address from which the customer wishes to find nearby service locations.

Figure 3:
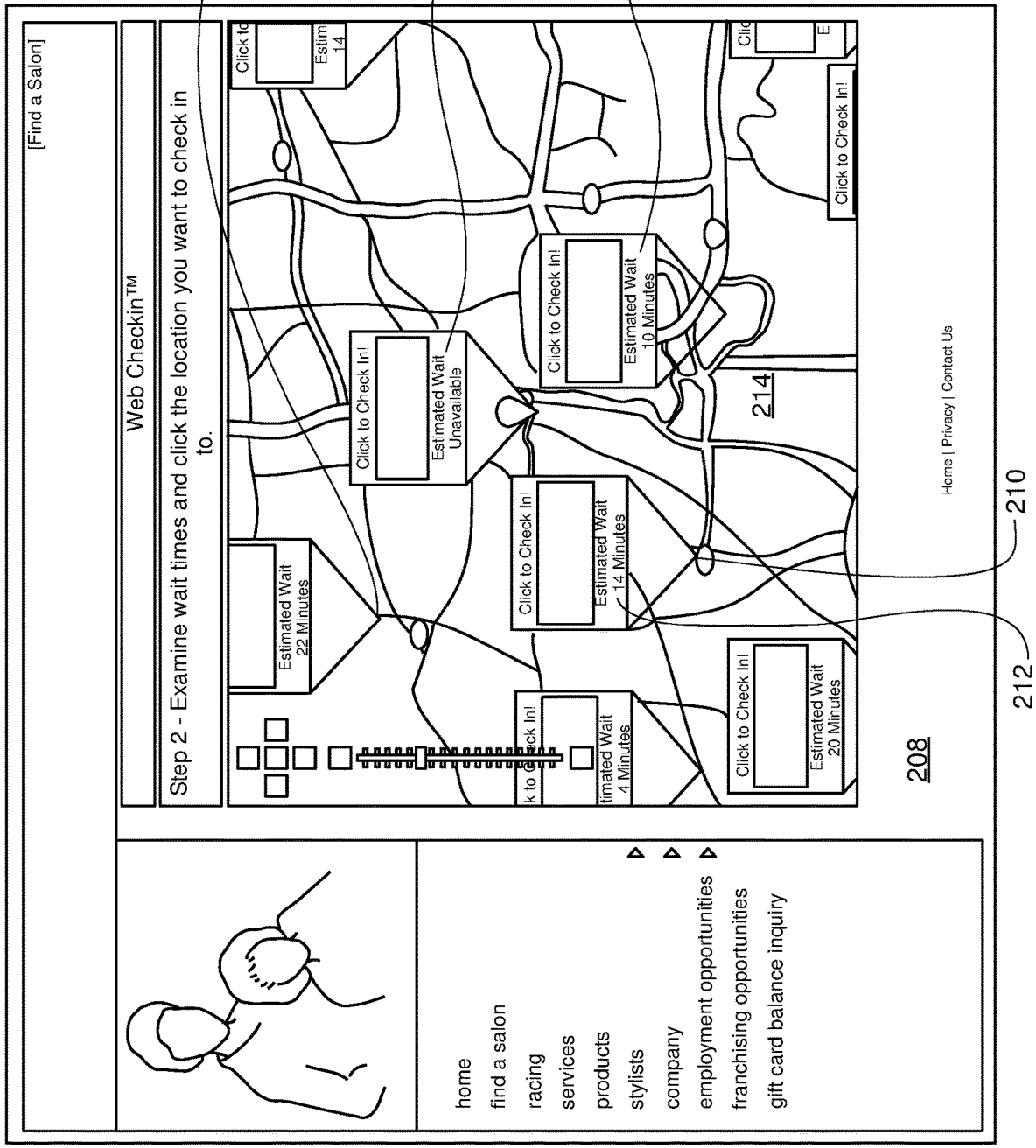
FIG. 3 is a screenshot of a wait time display page of a web-based customer check-in system according to the present disclosure.

After the customer has entered an address, the system displays the nearest locations 210 and estimated wait times 212 at each location 210. The customer can view the results on a wait time display page 208, depicted in FIG. 3, at step 106. Alternatively, the wait time display page 208 can automatically be displayed when a customer searches for the service or the business in a search engine, such as Google™. The business locations 210 displayed can be determined based on a designated number of locations or based on all locations within a certain distance of the entered address, such as, for example, 10 miles. Locations can alternatively be displayed based on wait times, such as, for example, all locations within a certain distance whose wait times are under 20 minutes. The locations 210 can be displayed graphically on a map 214 showing each location 210 relative to each other and the entered address. The graphical display can utilize, for example, Google™ Maps.

Figure 7:
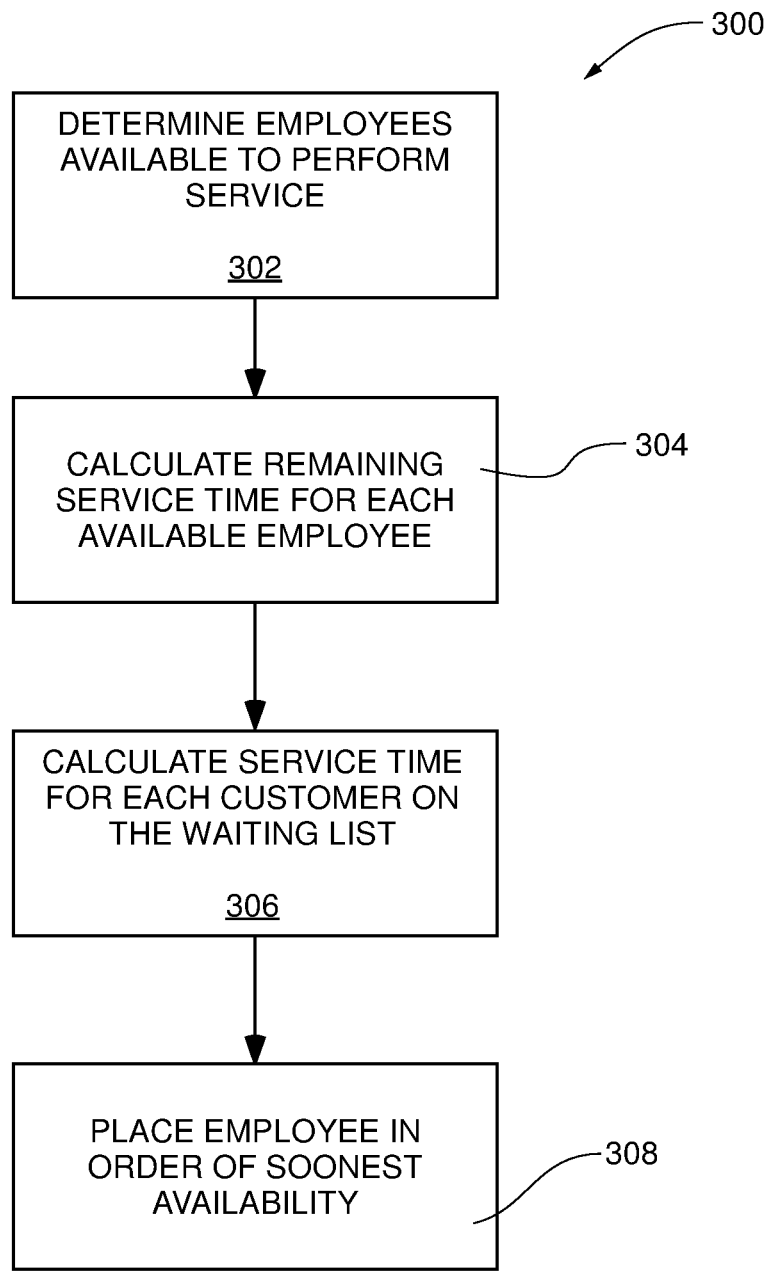
FIG. 7 is a flowchart of steps taken according to a wait time algorithm according to the present disclosure.

Estimated wait times can be determined according to the steps 300 of a wait time algorithm, as shown in FIG. 7. The algorithm first determines which employees of the business are currently available to perform services at the location at step 302. This can be done by having the employees "clock in" when they are working and having them "clock out" when their shifts are over or they go on break. Next, the remaining service time for each employee who is currently serving a customer is calculated at step 304. This calculation is estimated by first averaging historical service times for the particular employee performing the service based on the type of service performed and other relevant factors in the industry, such as, for example, the sex of the customer in the hair salon industry (because services performed on females typically take longer than similar services performed on males due to average hair length). The remaining service time is then calculated by subtracting the elapsed time for the service from the total estimated service time. After estimating the remaining service time for each employee, the employees are placed in order of soonest availability to serve another customer at step 306. Employees who are not currently serving a customer are therefore at the top of the list. Service time is then calculated for each customer on the waiting list at step 308. This is done by pairing the first customer on the waiting list with the first available employee and determining the estimated service time for the employee to perform the particular service for the particular customer. That service time is then added to that employee's total remaining service time and the list of available employees is reordered. This process is repeated for each customer on the waiting list and for each new customer who joins the waiting list. The wait time for each customer joining the waiting list is the shortest remaining service time for an active employee.

The above wait time calculation can be done continuously, or performed at regular intervals, so the wait time is always up-to-date. Changes that are taken into account in updating the wait time include: customers getting served (moving from the wait list to the service list), services being completed for customers, customers' desired service getting changed, customers leaving before being served, employees leaving and/or returning based on shift times and breaks, and services moving closer to completion as time elapses. If an employee is serving more than one customer at a time, then only the longest service time is considered in the calculation. The algorithm can also take into account customers who appear to have left the store by removing those customers from the calculation. If a customer should have been served (there was an employee available and the customer was the next one in line), but was not, the customer can be excluded from the calculation after a predetermined period, such as, for example, ten minutes. The calculation can also ignore employees who appear to be absent or otherwise unavailable. If an employee is clocked in and customers are waiting, but the employee is not serving any customers, the employee can be excluded after a predetermined period.

The wait time at each location can therefore be calculated in a statistically significant manner based on measured historical data. This is in contrast to the "gut-feeling" type of wait time typically given based solely on the number of customers ahead on the waiting list. Calculating wait times based on historical data allows customers to receive more accurate wait times. The historical data can be updated each time an employee performs a service, thereby constantly improving the accuracy of the wait time predictions.

Figure 4:
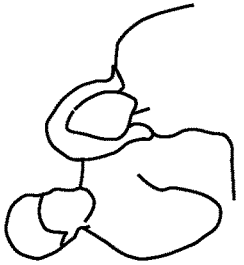
FIG. 4 is a screenshot of a customer information page of a web-based customer check-in system according to the present disclosure.

Upon viewing the various wait times at nearby locations, the customer can select a location at which the customer wishes to be placed on the waiting list at step 108 by clicking on a location on the map. To be placed on the waiting list, the customer enters information 218 into a customer information page 216, shown in FIG. 4, at step 110. The information 218 can include, for example, the customer's name, phone number, service requested, and the number of guests requesting services. Once the customer has submitted the requested information, the customer is placed on the location's waiting list. Thus, the customer need not physically arrive at the location to be placed on the waiting list. Once the customer is placed on the waiting list, the wait time algorithm automatically adjusts the estimated wait time for the location for subsequent customers using the system.

Figure 5:
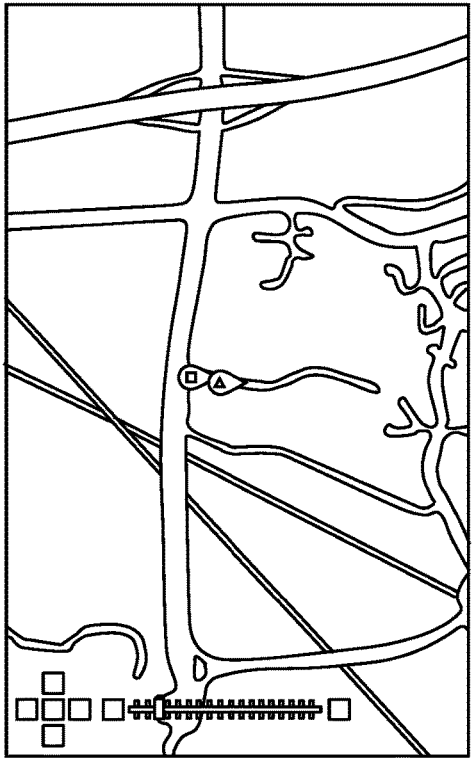
FIG. 5 is a screenshot of a confirmation and directions page of a web-based customer check-in system according to the present disclosure.

The customer can receive a confirmation that the customer has been placed on the waiting list for the selected location on a confirmation page 220 at step 112. The confirmation can also include driving directions 222 from the entered address to the location, as depicted in FIG. 5. Alternatively, the customer can be provided with an option of receiving directions from the confirmation page. The customer can now travel to the location and receive the requested service. Web-based customer check-in system therefore provides customers with the ability to select the location that will minimize the customer's wait time. The wait time is further minimized because the customer can be placed on the waiting list before arriving at the location, allowing the customer's travel time, which must take place anyway, to reduce the wait time.

When a customer checks in for a service via web-based customer check-in, the customer's entered information will appear on the business location's store interface 224 as shown in FIG. 6. Web check-in customers can be separately identified from walk-in customers through text 226 and/or graphics (i.e., a differently colored box). Web check-in customers join the waiting list 228 in the order of check-in with walk-in customers. An estimated wait time 230 can be displayed for each customer on the waiting list 228. A running overall estimated wait time incorporating both walk-in customers and web customers can be displayed on the store interface 224 to be given by employees to any walk-in customers who enter and wish to know what the wait time is. When a web check-in customer arrives at the store, the customer's information and requested service received from the web-based check-in can be confirmed by an employee. Once the customer is called to receive the customer's requested service, the customer is transferred from the wait list 228 to a service list 232 and each customer on the wait list 228 moves forward in the queue. The time that each customer has spent on the wait list 228 and on the service list 232 can also be displayed on the store interface 224. When a customer's service has been completed, the customer is removed from the service list 232.

Web-based customer check-in system and method can be used by any business that provides services to customers on a first-come, first-served basis. The system and method are designed for use with no-appointment business; it is not a web-based appointment scheduling system and method. It can be most advantageously employed by businesses providing such services at numerous locations that are situated relatively near each other from which customers may choose to visit. One type of business for which the disclosed system and method are particular well suited is no-appointment hair salon chains. A customer seeking a haircut, perm, or other service can remotely access the chain's website and enter the wait list at whichever nearby salon can provide the desired service at the most convenient time for the customer. This can significantly reduce the time a customer would otherwise spend sitting in the no-appointment salon's waiting room. The wait times given to customers are also much more accurate because they are based on measured historical data, which reduces the likelihood of customers arriving undesirably early or late for their requested services.

The embodiments above are intended to be illustrative and not limiting. Additional embodiments are encompassed within the scope of the claims. Although the present invention has been described with reference to particular embodiments, those skilled in the art will recognize that changes may be made in form and detail without departing from the spirit and scope of the invention.

The invention claimed is:

1. A method of providing a graphical user interface for a network-connected computer system that facilitates interactive internet-based customer check-in for customers desiring one of a plurality of different types of services from a no-appointment, first listed-first served business having a plurality of service locations, the method comprising:

providing a network-based graphical user interface associated with the business having a plurality of geographically disparate service locations, each service location of the business being a no appointment, first listed-first served location providing a plurality of different types of services having no appointed times to customers in temporal order of the customers being placed on an individual site-specific waiting list of a plurality of site-specific waiting lists for the service location;

continuously updating a plurality of wait time values, each wait time value corresponding to one of the plurality of site-specific waiting lists, and each wait time value representing an estimated wait time for a service at the service location of the business and each estimated wait time based on an estimated service time for each employee at the service location currently available to perform services, the estimated service time for each employee determined by pairing particular customers on a wait list with a particular employee, and using average historical service times for the particular employee to perform the particular services requested for each of the customers for which the employee is paired, wherein the average historical service time for a particular service performed by the particular employee is updated each time the particular employee provides the particular service;

receiving an indication of a location associated with a remote customer display;

causing the network-based graphical user interface to display, on the remote customer display, an interactive map including the location associated with the remote customer display, the interactive map including multiple user-selectable objects with each object representing one of the geographically disparate service locations of the business and positioned at a position on the interactive map corresponding to the represented service location;

causing the network-based graphical user interface to display, on the remote customer display, the wait time value corresponding to each of the geographically disparate service locations represented by at least some of the plurality of user-selectable objects;

receiving, via the network-based graphical user interface, a customer request submitted through the remote customer display to place the customer on the individual site-specific waiting list associated with a selected service location, the customer request being generated in response to the customer selecting a user-selectable object of the plurality of user-selectable objects on the interactive map representing the selected service location; and in response to the customer request, electronically transmitting information regarding the customer request to the selected service location represented by the selected object, such that the individual site-specific waiting list at the selected service location is updated to represent placement of the customer in that waiting list.

2. The method of claim 1, wherein causing the network-based graphical user interface to display, on the remote customer display, the wait time value corresponding to each of the geographically disparate service locations represented by at least some of the plurality of user-selectable objects includes causing each wait time value to display on each of the plurality of user-selectable objects of the represented service locations.

3. The method of claim 1, wherein each wait time value is updated in real-time on the network-based graphical user interface.

4. The method of claim 1, wherein causing the network-based graphical user interface to display, on the remote customer display, the interactive map includes causing the graphical user interface to display user-selectable objects corresponding to a plurality of service locations of only a single business.

5. The method of claim 1, wherein the individual site-specific waiting list at the selected service location is updated to represent placement of the customer in that waiting list before the customer receives confirmation of being placed on the waiting list.

6. The method of claim 1, wherein the network-based graphical user interface is caused to display the interactive map on the remote customer display in response to a user request to view estimated wait times at service locations near the location associated with the remote customer display.

7. The method of claim 1, wherein electronically transmitting information regarding the customer request to the selected service location includes transmitting personal information of the customer entered with the customer request.

8. The method of claim 1, wherein electronically transmitting information regarding the customer request to the selected service location includes retrieving and transmitting personal information of the customer previously entered with a previous customer request.

9. The method of claim 1, further comprising displaying driving directions from the location associated with the remote customer display to the selected service location.

* * * * *